United States Patent [19]
Forsberg et al.

[11] Patent Number: 5,360,458
[45] Date of Patent: Nov. 1, 1994

[54] OIL-WATER EMULSIONS

[75] Inventors: John W. Forsberg; Richard W. Jahnke, both of Mentor, Ohio

[73] Assignee: The Lubrizol Corporation, Wickliffe, Ohio

[21] Appl. No.: 717,683

[22] Filed: Jun. 19, 1991

Related U.S. Application Data

[63] Continuation-in-part of Ser. No. 319,059, Mar. 2, 1989, abandoned.

[51] Int. Cl.$^5$ .............................. C10L 1/22; C10L 1/30
[52] U.S. Cl. .................................. 44/301; 44/302; 137/13; 252/357; 431/4
[58] Field of Search ............... 44/300, 301, 302; 252/357; 260/404, 404.5; 137/13; 431/4, 8, 12; 564/138, 139, 141

[56] References Cited

U.S. PATENT DOCUMENTS

| | | | |
|---|---|---|---|
| 2,345,199 | 3/1944 | Hodson | 252/49 |
| 3,047,493 | 1/1962 | Rosenberg | 252/8.5 |
| 3,216,936 | 11/1965 | Le Suer | 252/32.7 |
| 3,219,666 | 11/1965 | Norman et al. | 260/268 |
| 3,269,946 | 8/1966 | Wiese | 252/32.5 |
| 3,281,356 | 10/1966 | Coleman | 252/32.7 |
| 3,311,561 | 3/1967 | Anderson et al. | 252/75 |
| 3,378,494 | 4/1968 | Berger | 252/77 |
| 3,509,052 | 4/1970 | Murphy | 252/34.7 |
| 3,595,793 | 7/1971 | Boehringer et al. | 252/34 |
| 3,629,119 | 12/1971 | Weaver | 252/77 |
| 3,943,954 | 5/1976 | Flourney et al. | 137/13 |
| 4,002,735 | 1/1977 | Wenzel et al. | 44/51 |
| 4,144,015 | 3/1979 | Berthiaume | 431/8 |
| 4,162,143 | 7/1979 | Yount III | 44/71 |
| 4,185,485 | 1/1980 | Schick et al. | 72/42 |
| 4,233,176 | 11/1980 | Conner, Sr. | 252/392 |
| 4,234,435 | 11/1980 | Meinhardt et al. | 252/51.5 |
| 4,253,974 | 3/1981 | Valcho et al. | 252/8.55 |
| 4,329,249 | 5/1982 | Forsberg | 252/34.7 |
| 4,342,596 | 8/1982 | Conner, Sr. | 252/394 |
| 4,368,133 | 1/1983 | Forsberg | 252/75 |
| 4,435,297 | 3/1984 | Forsberg | 252/34.7 |
| 4,447,348 | 5/1984 | Forsberg | 252/75 |
| 4,448,703 | 5/1984 | Forsberg | 252/75 |
| 4,570,056 | 2/1986 | Matlach et al. | 137/13 |
| 4,618,348 | 10/1986 | Hayes et al. | 44/51 |
| 4,659,492 | 4/1987 | Jahnke | 252/49.3 |
| 4,661,275 | 4/1987 | Forsberg | 252/49.3 |
| 4,666,620 | 5/1987 | Forsberg | 252/49.3 |
| 4,696,638 | 9/1987 | DenHerder | 44/51 |
| 4,708,753 | 11/1987 | Forsberg | 149/2 |
| 4,770,803 | 9/1988 | Forsberg | 252/49.3 |
| 4,776,977 | 10/1988 | Taylor | 252/314 |
| 4,781,819 | 11/1988 | Chirinos et al. | 208/309 |

FOREIGN PATENT DOCUMENTS

| | | |
|---|---|---|
| 0155800 | 9/1985 | European Pat. Off. . |
| 0156486 | 10/1985 | European Pat. Off. . |
| 0156572 | 10/1985 | European Pat. Off. . |
| 0184434 | 6/1986 | European Pat. Off. . |
| 0214843 | 3/1987 | European Pat. Off. . |
| 2169220 | 9/1986 | United Kingdom . |

OTHER PUBLICATIONS

Becher, Emulsions:*Theory & Practice*, 2nd ed., Reinhold Publishing Corp; N.Y.; N.Y. pp. 209–265, 1957 (No month provided).

Annual *Book of ASTM Standards*, "Petroleum Products, Lubricants, and Fossil Fuels", pp. 61–63, 1987, (No month provided).

Noller, C. R.; *Chemistry of Organic Compounds*, 2nd edition; W.B. Saunders Company; Philadelphia, 1957; pp. 147,179,180,181,282 and 861 (No month).

Rodriquez et al., "La Emulsion De Bitumen Orinoco En Aqua (Orimulsion) Como Combustible Excepcional En Plantas Termoelectricas", Revista Technica Intevep 7 (1):17–32, Enfro 1987, Mar. 31–Apr. 3, 1987.

*Primary Examiner*—Margaret Medley
*Attorney, Agent, or Firm*—Frederick D. Hunter, Sr.; John H. Engelmann

[57] ABSTRACT

This invention provides for water-oil emulsions comprising water, oil and a minor emulsifying amount of the reaction product of: (A) at least one saturated or unsaturated aliphatic monocarboxylic acid of about 12 to about 24 carbon atoms; (B) at least one acid of the general formula $C_{19}H_nCOOH$, wherein n is a number in the range of about 27 to about 31, and having a phenathrene nucleus; and (C) at least one amine. In one hydroxy embodiment, the oil employed in these emulsions can be any oil, the water content of these emulsions being up to about 30% by weight. In a preferred embodiment, the oil employed is crude oil. These emulsions can be facilitatingly pumped through a conduit even when the oil employed is a viscous crude oil. These emulsions are useful as a combustible fuel when the water content is below about 30% by weight.

41 Claims, No Drawings

OIL-WATER EMULSIONS

This application is a continuation-in-part of U.S. application Ser. No. 07/319,059, filed Mar. 2, 1989, now abandoned. The disclosure in said prior application is incorporated herein by reference in its entirety.

TECHNICAL FIELD

This invention relates to oil-water emulsions containing emulsifiers derived from (A) at least one carboxylic acid, (B) at least one abietic-type or pimaric-type acid, and (C) at least one amine. These emulsions can be made using any oil. In one embodiment of the invention, oil-water emulsions using viscous crude oils are provided.

BACKGROUND OF THE INVENTION

Many crude oils are viscous when produced and are thus difficult, if not impossible, to transport by normal methods from their production location to a refinery.

Several methods have been suggested for the transportation of such crudes by pipeline. These include heating the crude and insulating the pipeline, adding a non-recoverable solvent, adding a recoverable solvent, and adding a lighter crude oil. These methods are, however, expensive in terms of added components and capital expenditure. It has also been suggested to form an annulus of water around the crude, but this method is technically difficult to achieve.

It has been suggested to emulsify the crude in water. To date, this method has not been found to be entirely satisfactory due to the fact that suitable emulsifiers have not been suggested.

U.K. Patent Application GB 2169220 A discloses an emulsion of crude oil in water prepared by adding an organic acid containing 8 or more carbon atoms per molecule to the crude oil, adding an aqueous alkaline solution and emulsifying the resulting mixture. This reference indicates that the viscosity of the emulsion is less than that of the crude, and the emulsion can be transported through a pipeline. Aliphatic carboxylic acids with a $C_8$ to $C_{30}$ alkyl group, e.g., stearic acid, and petroleum sulphonates are disclosed as being useful.

EPO Application 0156486 A2 discloses a method for the preparation of an HIPR (high internal phase ratio) emulsion of oil in water. The method comprises directly mixing 70 to 98% by volume of a viscous oil with 30 to 2% by volume of an aqueous solution of an emulsifying surfactant or an alkali. Mixing is effected under low shear conditions in the range of 10 to 1000 reciprocal seconds in such manner that an emulsion is formed comprising highly distorted oil droplets having mean droplet diameters in the range of 2 to 40 microns separated by thin interfacial films.

EPO Application 0184434 A2 discloses a method for reducing the salt content of a heavy crude oil. The method comprises the steps of (a) mixing 70 to 98% by volume of a heavy crude oil with 30 to 2% by volume of an aqueous solution of an emulsifying surfactant or an alkali, mixing being effected under low shear conditions in the range of 10 to 1000 reciprocal seconds in such manner that an HIPR emulsion is formed comprising distorted oil droplets having mean droplet diameters in the range of 2 to 50 microns separated by aqueous films, (b) breaking the resulting emulsion, and (c) separating the resulting mixture into a layer of relatively salt-free oil and a layer of relatively salt-enhanced water.

U.S. Pat. No. 4,776,977 and EPO Application 0214843 A2 disclose a continuous method for the preparation of an emulsion of oil in water. The method comprises initially preparing an HIPR emulsion of oil in water by directly mixing 70 to 98% by volume of a viscous oil with 30 to 2% by volume of an aqueous solution of an emulsifying surfactant or an alkali, mixing being effected under low shear conditions in the range of 10 to 1000 reciprocal seconds in such manner that an emulsion is formed comprising distorted oil droplets having mean droplet diameters in the range of 2 to 50 microns separated by aqueous films. The conductivity of the HIPR emulsion is measured, the quantity of aqueous liquid to be added as a diluent is determined, and the HIPR emulsion is diluted with the required quantity of diluent.

SUMMARY OF THE INVENTION

This invention provides for water-oil emulsions comprising water, oil and a minor emulsifying amount of the reaction product of: (A) at least one saturated or unsaturated aliphatic monocarboxylic acid of about 6 to about 24 carbon atoms; (B) at least one acid of the general formula $C_{19}H_nCOOH$, wherein n is a number in the range of about 27 to about 31, and having a phenanthrene nucleus; and (C) at least one amine. In one embodiment, the oil employed in these emulsions can be any oil, the water content of these emulsions being up to about 80% by weight. In another embodiment, the oil employed is crude oil. These emulsions can be facilitatingly pumped through a conduit even when the oil employed is a viscous crude oil. These emulsions are useful as combustible fuels when the water content is below about 40% by weight.

DESCRIPTION OF THE PREFERRED EMBODIMENTS

The term "hydrocarbyl" is used herein and in the appended claims to include:

(1) hydrocarbyl groups, that is, aliphatic (e.g., alkyl or alkenyl), alicyclic (e.g., cycloalkyl, cycloalkenyl), aromatic, aliphatic- and alicyclic-substituted aromatic groups and the like as well as cyclic groups wherein the ring is completed through another portion of the molecule (that is, any two indicated groups may together form an alicyclic group);

(2) substituted hydrocarbyl groups, that is, those groups containing non-hydrocarbon groups which, in the context of this invention, do not alter the predominantly hydrocarbyl nature of the hydrocarbyl group; those skilled in the art will be aware of such groups, examples of which include ether, oxo, halo (e.g., chloro and fluoro), alkoxyl, mercapto, alkylmercapto, nitro, nitroso, sulfoxy, etc.;

(3) hetero groups, that is, groups which will, while having predominantly hydrocarbyl character within the context of this invention, contain other than carbon present in a ring or chain otherwise composed of carbon atoms. Suitable heteroatoms will be apparent to those of skill in the art and include, for example, sulfur, oxygen, nitrogen and such substituents as pyridyl, furanyl, thiophenyl, imidazolyl, etc.

In general, no more than about three non-hydrocarbon groups or heteroatoms and preferably no more than one, will be present for each 10 carbon atoms in a hydrocarbyl group. Typically, there will be no such groups or heteroatoms in a hydrocarbyl group and it will, therefore, be purely hydrocarbyl.

The hydrocarbyl groups are preferably free from acetylenic unsaturation; ethylenic unsaturation, when present will generally be such that there is no more than one ethylenic linkage present for every 10 carbon-to-carbon bonds. The hydrocarbyl groups are often completely saturated and therefore contain no ethylenic unsaturation.

The term "lower" as used in the present specification and claims, when used in conjunction with terms such as alkyl, alkenyl, alkoxy, and the like, is intended to describe such groups which contain a total of up to 7 carbon atoms.

Oil-Water Emulsions

The terms "oil-water emulsion" and "water-oil emulsion" both refer to emulsions of water and oil, mean the same thing and are thus interchangeable. These emulsions can be water-in-oil emulsions, oil-in-water emulsions, and in some instances mixtures of both. The term "water-in-oil emulsion" refers to emulsions wherein the continuous phase is oil and the discontinuous phase is water, the discontinuous water phase being dispersed in the continuous oil phase. The term "oil-in-water emulsion" refers to emulsions wherein the continuous phase is water and the discontinuous phase is oil, the discontinuous oil phase being dispersed in the continuous water phase. Mixtures can be provided wherein in parts of the emulsion the oil phase is the continuous phase and water is dispersed in said oil phase, while in other parts of the emulsion the water phase is the continuous phase and oil is dispersed in said water phase.

The inventive oil-water emulsions contain up to about 80% by weight water, more preferably up to about 65% by weight water, more preferably up to about 40% by weight water. Typically these emulsions contain from about 10% to about 80% by weight water, more preferably from about 10% to about 65% by weight water, more preferably from about 10% to about 40% by weight water, more preferably about 20% to about 40% by weight water; and from about 20% to about 90% by weight oil, more preferably from about 35% to about 90% by weight oil, more preferably from about 60% to about 90% by weight oil, more preferably from about 60% to about 80% by weight oil.

The oil that is useful in the inventive emulsions can be any oil. Mineral oils can be used. Oils from a variety of sources, including natural and synthetic oils and mixtures thereof can be used.

Natural oils include animal oils and vegetable oils (e.g., castor oil, lard oil) as well as solvent-refined or acid-refined mineral lubricating oils of the paraffinic, naphthenic, or mixed paraffin-naphthenic types. Oils of lubricating viscosity derived from coal or shale are also useful. Synthetic lubricating oils include hydrocarbon oils and halo-substituted hydrocarbon oils such as polymerized and interpolymerized olefins (e.g., polybutylenes, polypropylenes, propyleneisobutylene copolymers, chlorinated polybutylenes, etc.); alkyl benzenes (e.g., dodecylbenzenes, tetradecylbenzenes, dinonylbenzenes, di-(2-ethylhexyl) benzenes, etc.); polyphenols (e.g., biphenyls, terphenyls, etc.); and the like. Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of about 1000, diphenyl ether of polyethylene glycol having a molecular weight of about 500–1000, diethyl ether of polypropylene glycol having a molecular weight of about 1000–1500, etc.) or mono- and polycarboxylic esters thereof, for example, the acetic acid esters, mixed $C_{3-8}$ fatty acid esters, or the $C_{13}$ Oxo acid diester of tetraethylene glycol. Another suitable class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like. Silicon-based oils such as the polyalkyl-, polyaryl-, polyalkoxy-, or polyaryloxy-siloxane oils and silicate oils comprise another useful class of synthetic lubricants (e.g., tetraethyl-silicate, tetraisopropyl-silicate, tetra-(2-ethylhexyl)-silicate, tetra-(4-methyl-2-tetraethyl)-silicate, tetra-(p-tert-butylphenyl)-silicate, hexyl-(4-methyl-2-pentoxy)-di- siloxane, poly(ethyl)-siloxanes, poly(-methylphenyl)-siloxanes, etc.). Other synthetic oils include liquid esters of phorphorus-containing acids (e.g., tricresyl phosphate, trioctyl phosphate, diethyl ester of decane phosphonic acid, etc.), polymeric tetrahydrofurans, and the like.

Unrefined, refined and rerefined oils (and mixtures of each with each other) of the type disclosed hereinabove can be used in the emulsions of the present invention. Unrefined oils are those obtained directly from a natural or synthetic source without further purification treatment. For example, crude oil obtained directly from an oil field or reservoir, shale oil obtained directly from retorting operations, petroleum oil obtained directly from distillation, or ester oil obtained directly from an esterification process and used without further treatment are unrefined oils. The term "crude oil" is used herein to refer to unrefined oil obtained directly from an oil field or reservoir, as well as oil obtained from an oil field or reservoir which has undergone one or more desalting treatments to reduce the salt content thereof and/or one or more dehydration treatments to reduce the water content thereof. Refined oils are similar to the unrefined oils except that they have been further treated in one or more purification steps to improve one or more properties. Many such purification techniques are known to those of skill in the art such as solvent extraction, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

In one embodiment the oil is a viscous oil, preferably a viscous mineral oil, having a Brookfield viscosity in excess of about 20,000 centipoise at 40° C. The viscosity is preferably in the range of about 20,000 to about 500,000 centipoise at 40° C., but can be in the range of about 20,000 to about 250,000 centipoise at 40° C., or about 20,000 to about 100,000 centipoise at 400° C. In one embodiment, this oil is a crude oil. In one embodiment, this oil is a crude oil fraction (e.g., a crude oil residium or bottoms product).

In one embodiment the oil is a crude oil fraction having a boiling range midpoint in excess of about 300° C., or in excess of about 350° C., or in excess of about 400° C., or in excess of about 450° C., or in excess of about 500° C. The term "boiling range midpoint" is used herein to refer to the temperature at atmospheric pressure at which 50% by weight of a mixture of materials having different boiling points boils at or above, and 50% by weight boils at or below. For example, a crude oil fraction having a boiling range midpoint of 350° C. contains 50% by weight oil that boils at or above 350° C. and 50% by weight that boil at or below 350° C. These crude oil fractions can be crude oil residiums or crude oil bottoms products. These crude oil fractions typically have Brookfield viscosities in excess of about 20,000 centipoise at 40° C. They can have Brookfield viscosities in excess of about 30,000 centipoise, or in excess of about 50,000 centipoise, or in excess of about 100,000 centipoise, or in excess of about 250,000 centipoise at 40° C. In one embodiment, the crude oil fraction is solid at 40° C. and thus a Brookfield viscosity for this fraction cannot be measured at 40° C. Examples of these crude oil fractions include Venezuelan crude oil residiums boiling at temperatures in excess of about 325° C. and having Brookfield viscosities at 40° C. of about 20,000 centipoise; Arabian crude oil residiums boiling at temperatures in excess of about 535° C. and in one embodiment having Brookfield viscosities at 40° C. of about 20,000 to about 50,000 centipoise and in another embodiment having Brookfield viscosities at 40° C. in the range of about 200,000 to about 500,000 centipoise; Maya crude oil residiums boiling at a temperature in excess of about 350° C. and having Brookfield viscosities at 40° C. of about 30,000 to about 40,000 centipoise; and Maya crude oil residiums boiling at a temperature in excess of about 535° C., these crude oil residiums being solids at 40° C.

In one embodiment the oil is a viscous, heavy and/or asphaltenic crude oil. These crudes typically have a Brookfield viscosity in the range of about 20,000 to about 250,000 centipoise at 40° C., and in some instances a Brookfield viscosity in the range of 20,000 to about 100,000 centipoise at 40° C. Examples of such crudes include Lake Marguerite crude oil from Alberta, Hewitt crude oil from Oklahoma, and Cerro Negro crude oil from the Orinoco Oil Belt. The API gravity for these crude oils is typically in the range of about 5° to about 20°, and in some instances in the range of about 7° to about 10°, although crude oils outside this API range can be used. For example, non-asphaltenic crude oils such as Beatrice from the North Sea which has an API gravity of about 30° can be used.

The invention is particularly suitable for forming oil-water emulsions using heavy crude oil from the Orinoco Oil Belt. These crudes typically have a Brookfield viscosity in the range of about 20,000 to about 250,000 centipoise, usually in the range of about 20,000 to about 100,000 centipoise, at 40° C. These crudes typically have an API gravity in the range of about 7° to about 10°, a sulfur content in the range of about 3.2% to about 3.8% by weight, a vanadium content in the range of about 250 to about 500 ppm, and a nickel content in the range of about 60 to about 120 ppm.

Emulsifiers

The inventive oil-water emulsions contain a minor emulsifying amount, preferably from about 0.005% to about 2% by weight, more preferably about 0.01% to about 1% by weight, more preferably about 0.05% to about 0.5% by weight, more preferably about 0.05% to about 0.3% by weight of the reaction product of: (A) at least one saturated or unsaturated aliphatic monocarboxylic acid of about 6 to about 24 carbon atoms; (B) at least one acid of the general formula $C_{19}H_nCOOH$, wherein n is a number in the range of about 27 to about 31, and having a phenanthrene nucleus; and (C) at least one amine.

Component (A)

The acids (A) useful in making these emulsifiers are saturated or unsaturated aliphatic monocarboxylic acids of about 6 to about 24 carbon atoms, preferably about 12 to about 22 carbon atoms, more preferably about 16 to about 18 carbon atoms. Fatty acids within this group, that is acids derived from vegetable fat or oil, are useful. Examples of useful saturated acids include caproic acid, caprylic acid, capric acid, lauric acid, myristic acid, palmitic acid, stearic acid, arachidic acid, behenic acid, lignoceric acid, and mixtures of two or more thereof. Examples of useful unsaturated acids include myristoleic acid, palmitoleic acid, oleic acid, elaidic acid, erucic acid, ricinoleic acid, linoleic acid, linolenic acid, licanic acid, eleostearic acid, and mixtures of two or more thereof. 2-ethyl hexanoic acid is useful. Tall oil acid is useful. (The term "tall oil acid" is used herein to refer to fatty acids, e.g., oleic acid and linoleic acid, which are derived from tall oil.)

Component (B)

The acids (B) useful in making these emulsifiers are abietic-type and/or pimaric-type acids. These acids can be represented by the general formula $C_{19}H_nCOOH$, wherein n is a number in the range of about 27 to about 31, and is preferably 29; these acids having a phenanthrene nucleus. Examples of useful acids include abietic acid, dihydroabietic acid, dehydroabietic acid, neoabietic acid, palustric acid, pimaric acid, isopimaric acid, levopimaric acid, and mixtures of two or more thereof. Rosin or resin acids are useful.

In one embodiment of the invention, tall oil is used as a source for both components (A) and (B). The term "tall oil" is used herein in its conventional sense to refer to mixtures of rosin acids, fatty acids and other materials typically obtained as by-products in the pulping of pine wood. Tall oil is often commercially available as distilled tall oil and the term "tall oil" is used hereto to also refer to distilled tall oil. An example of a commercially available tall oil that is particularly useful is Unitol DT-40, which is a product of Union Camp identified as a distilled tall oil having a monomeric fatty acid content of 40% by weight, a dimerized fatty acid content of 11% by weight, an esterified fatty acid content of 7% by weight, a rosin acid content of about 40% by weight, and 2% by weight unsaponifiables.

Component (C)

The amines (C) useful in making these emulsifiers can be primary, secondary or tertiary amines. They can be monoamines or polyamines. They can be aliphatic, cycloaliphatic, aromatic or heterocyclic, including aliphatic-substituted aromatic, aliphatic-substituted cycloaliphatic, aliphatic-substituted heterocyclic, cycloaliphatic-substituted aliphatic, cycloaliphatic-substituted aromatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted cycloaliphatic and heterocyclic-substituted aromatic amines. These amines may be saturated or unsaturated. If unsaturated, the amine is preferably free from acetylenic unsaturation. The amines may also contain non-hydrocarbon substituents or groups as long as these groups do not significantly interfere with the reaction of the amines with the hydrocarbyl-substituted carboxylic acids and derivatives thereof of this invention. Such non-hydrocarbon substituents or groups include lower alkoxy, lower alkyl, mercapto, nitro, and interrupting groups such as —O— and —S— (e.g., as in such groups as —CH$_2$CH$_2$—X—CH$_2$CH$_2$— where X is —O— or —S—). Mixtures of two or more of said amines can be used.

With the exception of the branched polyalkylene polyamines, the polyoxyalkylene polyamines and the high molecular weight hydrocarbyl-substituted amines described more fully hereinafter, the amines used in this invention ordinarily contain less than about 40 carbon atoms in total and usually not more than about 20 carbon atoms in total.

Aliphatic monoamines include mono-aliphatic and di-aliphatic-substituted amines wherein the aliphatic groups can be saturated or unsaturated and straight or branched chain. Thus, they are primary or secondary aliphatic amines. Such amines include, for example, mono- and di-alkyl-substituted amines, mono- and di-alkenyl-substituted amines, and amines having one N-alkenyl substituent and one N-alkyl substituent, and the like. The total number of carbon atoms in these aliphatic monoamines preferably does not exceed about 40 and usually does not exceed about 20 carbon atoms. Specific examples of such monoamines include ethylamine, diethylamine, n-butylamine, di-n-butylamine, allylamine, isobutylamine, cocoamine, stearylamine, laurylamine, methyllaurylamine, oleylamine, N-methyl-octylamine, dodecylamine, octadecylamine, and the like. Examples of cycloaliphatic-substituted aliphatic amines, aromatic-substituted aliphatic amines, and heterocyclic-substituted aliphatic amines, include 2-(cyclohexyl)-ethylamine, benzylamine, phenylethylamine, and 3-(furylpropyl) amine.

Cycloaliphatic monoamines are those monoamines wherein there is one cycloaliphatic substituent attached directly to the amino nitrogen through a carbon atom in the cyclic ring structure. Examples of cycloaliphatic monoamines include cyclohexylamines, cyclopentylamines, cyclohexenylamines, cyclopentenylamines, N-ethyl-cyclohexylamines, dicyclohexylamines, and the like. Examples of aliphatic-substituted, aromatic-substituted, and heterocyclic-substituted cycloaliphatic monoamines include propyl-substituted cyclohexylamines, phenyl-substituted cyclopentylamines and pyranyl-substituted cyclohexylamine.

Suitable aromatic amines include those monoamines wherein a carbon atom of the aromatic ring structure is attached directly to the amino nitrogen. The aromatic ring will usually be a mononuclear aromatic ring (i.e., one derived from benzene) but can include fused aromatic rings, especially those derived from naphthylene. Examples of aromatic monoamines include aniline, di(-para-methylphenyl) amine, naphthylamine, N-(n-butyl) aniline, and the like. Examples of aliphatic-substituted, cycloaliphatic-substituted, and heterocyclic-substituted aromatic monoamines include para- ethoxyaniline, paradodecylamine, cyclohexyl-substituted naphthylamine and thienyl-substituted aniline.

Suitable polyamines include aliphatic, cyclo- aliphatic and aromatic polyamines analogous to the above-described monoamines except for the presence within their structure of another amino nitrogen. The other amino nitrogen can be a primary, secondary or tertiary amino nitrogen. Examples of such polyamines include N-aminopropyl-cyclohexylamine, N-N'-di-n-butyl-para-phenylene diamine, bis-(para-aminophenyl)-methane, 1,4-diaminocyclohexane, and the like.

Heterocyclic mono- and polyamines can also be used. Heterocyclic amines can be saturated or unsaturated and can contain various substituents such as nitro, alkoxy, alkyl mercapto, alkyl, alkenyl, aryl, alkaryl, or aralkyl substituents. Generally, the total number of carbon atoms in the substituents will not exceed about 20. Heterocyclic amines can contain heteroatoms other than nitrogen, especially oxygen and sulfur, and they can contain more than one nitrogen heteroatom. The 5- and 6-membered heterocyclic rings are useful.

Among the suitable heterocyclics are aziridines, azetidines, azolidines, tetra- and di-hydropyridines, pyrroles, indoles, piperadines, imidazoles, di- and tetrahydroimidazoles, piperazines, isoindoles, purines, morpholines, thiomorpholines, N-aminoalkylmorpholines, N-aminoalkylthiomorpholines, N-aminoalkylpiperazines, N,N'-di-aminoalkylpiperazines, azepines, azocines, azonines, azecines and tetra-, di- and perhydro- derivatives of each of the above and mixtures of two or more of these heterocyclic amines. Preferred heterocyclic amines are the saturated 5- and 6-membered heterocyclic amines containing only nitrogen, oxygen and/or sulfur in the hetero ring, especially the piperidines, piperazines, thiomorpholines, morpholines, pyrrolidines, and the like. Piperidine, aminoalkyl-substituted piperidines, piperazine, aminoalkyl-substituted piperazines, morpholine, aminoalkyl-substituted morpholines, pyrrolidine, and aminoalkyl-substituted pyrrolidines, are useful. Usually the aminoalkyl substituents are substituted on a nitrogen atom forming part of the hetero ring. Specific examples of such heterocyclic amines include N-aminopropylmorpholine, N-aminoethylpiperazine, and N,N'-di-aminoethylpiperazine.

Hydroxyamines both mono- and polyamines, analogous to those described above are also useful. The hydroxy-substituted amines contemplated are those having hydroxy substituents bonded directly to a carbon atom other than a carbonyl carbon atom; that is, they have hydroxy groups capable of functioning as alcohols. Examples of such hydroxy-substituted amines include ethanolamine, di(3-hydroxypropyl)-amine, 3-hydroxybutylamine, 4-hydroxybutylamine, diethanolamine, di(2- hydroxypropyl) amine, N-hydroxypropyl-propylamine, N-(2- hydroxyethyl)-cyclohexylamine, 3-hydroxycyclopentylamine, parahydroxyaniline, N-hydroxyethyl piperazine, and the like.

The terms hydroxyamine and aminoalcohol describe the same class of compounds and, therefore, can be used interchangeably.

Also suitable as amines are the aminosulfonic acids and derivatives thereof corresponding to the formula:

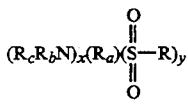

wherein R is OH, NH$_2$, ONH$_4$, etc.; R$_a$ is a polyvalent organic group having a valence equal to x+y; R$_b$ and R$_c$ are each independently hydrogen, hydrocarbyl or substituted hydrocarbyl with the proviso that at least one of R$_b$ and R$_c$ is hydrogen per aminosulfonic acid molecule; x and y are each integers equal to or greater than one. Each aminosulfonic reactant ts characterized by at least one HN< or H$_2$N— group and at least one

group. These sulfonic acids can be aliphatic, cycloaliphatic or aromatic aminosulfonic acids and the corresponding functional derivatives of the sulfo group. Specifically, the aminosulfonic acids can be aromatic aminosulfonic acids, that is, where R$_a$ is a polyvalent aromatic group such as phenylene where at least one

group is attached directly to a nuclear carbon atom of the aromatic group. The aminosulfonic acid may also be a mono-amino aliphatic sulfonic acid; that is, an acid where x is one and R$_a$ is a polyvalent aliphatic group such as ethylene, propylene, trimethylene, and 2-methylene propylene. Other suitable aminosulfonic acids and derivatives thereof useful as amines in this invention are disclosed in U.S. Pat. Nos. 3,029,250; 3,367,864; and 3,926,820; which are incorporated herein by reference.

Hydrazine and substituted-hydrazine can also be used as amines in this invention. The substituents which may be present on the hydrazine include alkyl, alkenyl, aryl, aralkyl, alkaryl, and the like. Usually, the substituents are alkyl, especially lower alkyl, phenyl, and substituted phenyl such as lower alkoxy-substituted phenyl or lower alkyl-substituted phenyl. Specific examples of substituted hydrazines are methylhydrazine, N,N-dimethylhydrazine, N,N'-dimethylhydrazine, phenyl-hydrazine, N-phenyl-N'-ethylhydrazine, N-(paratolyl)-N'-(n-butyl)-hydrazine, N-(para-nitrophenyl)-hydrazine, N-(para-nitrophenyl)-N-methylhydrazine, N,N', di-(para-chlorophenol)-hydrazine, N-phenyl-N'-cyclohexylhydrazine, and the like.

The high molecular weight hydrocarbyl amines, both monoamines and polyamines, which can be used as amines in this invention are generally prepared by reacting a chlorinated polyolefin having a molecular weight of at least about 400 with ammonia or an amine. The amines that can be used are known in the art and described, for example, in U.S. Pat. Nos. 3,275,554 and 3,438,757, both of which are incorporated herein by reference. These amines must possess at least one primary or secondary amino group.

Another group of amines suitable for use in this invention are branched polyalkylene polyamines. The branched polyalkylene polyamines are polyalkylene polyamines wherein the branched group is a side chain containing on the average at least one nitrogen-bonded aminoalkylene

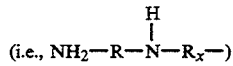

group per nine amino units present on the main chain; for example, 1–4 of such branched chains per nine units on the main chain, but preferably one side chain unit per nine main chain units. Thus, these polyamines contain at least three primary amino groups and at least one tertiary amino group. These amines may be expressed by the formula:

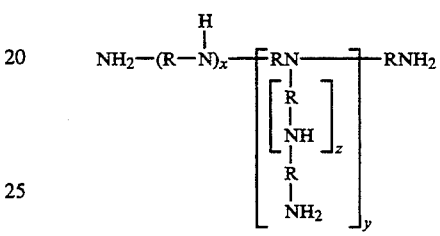

wherein R is an alkylene group such as ethylene, propylene, butylene and other homologs (both straight chained and branched), etc., but preferably ethylene; and x, y and z are integers; x is in the range of from about 4 to about 24 or more, preferably from about 6 to about 18; y is in the range of from 1 to about 6 or more, preferably from 1 to about 3; and z is in the range of from zero to about 6, preferably from zero to about 1. The x and y units may be sequential, alternative, orderly or randomly distributed. A useful class of such polyamines includes those of the formula:

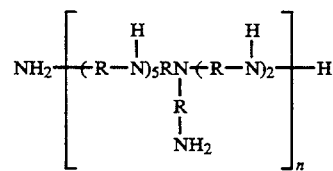

wherein n is an integer in the range of from 1 to about 20 or more, preferably in the range of from 1 to about 3, and R is preferably ethylene, but may be propylene, butylene, etc. (straight chained or branched). Useful embodiments are represented by the formula:

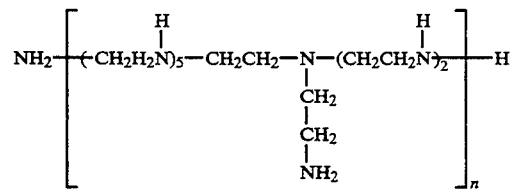

wherein n is an integer in the range of 1 to about 3. The groups within the brackets may be joined in a head-to-head or a head-to-tail fashion. U.S. Pat. Nos. 3,200,106 and 3,259,578 are incorporated herein by reference for their disclosures relative to said polyamines.

Suitable amines also include polyoxyalkylene polyamines, e.g., polyoxyalkylene diamines and polyoxyalkylene triamines, having average molecular weights ranging from about 200 to about 4000, preferably from about 400 to 2000. Examples of these polyoxyalkylene polyamines include those amines represented by the formula:

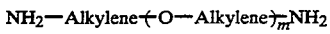

wherein m has a value of from about 3 to about 70, preferably from about 10 to about 35; and the formula:

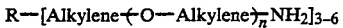

wherein n is a number in the range of from 1 to about 40, with the proviso that the sum of all of the n's is from about 3 to about 70 and generally from about 6 to about 35, and R is a polyvalent saturated hydrocarbyl group of up to about 10 carbon atoms having a valence of from about 3 to about 6. The alkylene groups may be straight or branched chains and contain from 1 to about 7 carbon atoms, and usually from 1 to about 4 carbon atoms. The various alkylene groups present within the above formulae may be the same or different.

More specific examples of these polyamines include:

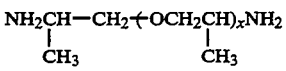

wherein x has a value of from about 3 to about 70, preferably from about 10 to 35; and

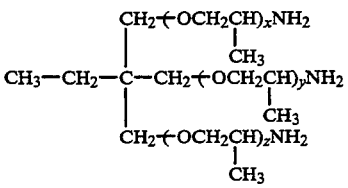

wherein x+y+z have a total value ranging from about 3 to about 30, preferably from about 5 to about 10.

Useful polyoxyalkylene polyamines include the polyoxyethylene and polyoxypropylene diamines and the polyoxypropylene triamines having average molecular weights ranging from about 200 to about 2000. The polyoxyalkylene polyamines are commercially available from the Jefferson Chemical Company, Inc. under the trade name "Jeffamine". U.S. Pat. Nos. 3,804,763 and 3,948,800 are incorporated herein by reference for their disclosure of such polyoxyalkylene polyamines.

Useful amines are the alkylene polyamines, including the polyalkylene polyamines, as described in more detail hereafter. The alkylene polyamines include those conforming to the formula:

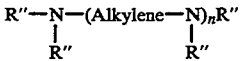

wherein n is from 1 to about 10; each R" is independently a hydrogen atom, a hydrocarbyl group or a hydroxy-substituted hydrocarbyl group having up to about 30 carbon atoms, and the "Alkylene" group has from about 1 to about 10 carbon atoms with the preferred alkylene being ethylene or propylene. Useful are the alkylene polyamines wherein each R" is hydrogen with the ethylene polyamines, and mixtures of ethylene polyamines being particularly preferred. Usually n will have an average value of from about 2 to about 7. Such alkylene polyamines include methylene polyamines, ethylene polyamines, butylene polyamines, propylene polyamines, pentylene polyamines, hexylene polyamines, heptylene polyamines, etc. The higher homologs of such amines and related aminoalkyl-substituted piperazines are also included.

Alkylene polyamines that are useful include ethylene diamine, triethylene tetramine, propylene diamine, trimethylene diamine, hexamethylene diamine, decamethylene diamine, octamethylene diamine, di(heptamethylene) triamine, tripropylene tetramine, tetraethylene pentamine, trimethylene diamine, pentaethylene hexamine, di(trimethylene) triamine, N-(2-aminoethyl) piperazine, 1,4-bis(2-aminoethyl) piperazine, and the like. Higher homologs as are obtained by condensing two or more of the above-illustrated alkylene amines are useful as amines in this invention as are mixtures of two or more of any of the afore-described polyamines.

Ethylene polyamines, such as those mentioned above, are described in detail under the heading "Diamines and Higher Amines" in The Encyclopedia of Chemical Technology, Second Edition, Kirk and Othmer, Volume 7, pages 27–39, Interscience Publishers, Division of John Wiley and Sons, 1965, these pages being incorporated herein by reference. Such compounds are prepared most conveniently by the reaction of an alkylene chloride with ammonia or by reaction of an ethylene imine with a ring-opening reagent such as ammonia, etc. These reactions result in the production of the somewhat complex mixtures of alkylene polyamines, including cyclic condensation products such as piperazines.

Hydroxyalkyl alkylene polyamines having one or more hydroxyalkyl substituents on the nitrogen atoms, are also useful in preparing compositions of the present invention. Useful hydroxyalkyl-substituted alkylene polyamines include those in which the hydroxyalkyl group is a lower hydroxyalkyl group, i.e., having less than 8 carbon atoms. Examples of such hydroxyalkyl-substituted polyamines include N-(2-hydroxyethyl) ethylene diamine, N,N-bis(2-hydroxyethyl) ethylene diamine, 1-(2-hydroxyethyl)-piperazine, monohydroxypropyl-substituted diethylene triamine, dihydroxypropyl-substituted tetraethylene pentamine, N-(3-hydroxybutyl) tetramethylene diamine, etc. Higher homologs as are obtained by condensation of the above-illustrated hydroxy alkylene polyamines through amino groups or through hydroxy groups are likewise useful. Condensation through amino groups results in a higher amine accompanied by removal of ammonia and condensation through the hydroxy groups results in products containing ether linkages accompanied by removal of water.

The amines that are useful include tertiary amines. The tertiary amines are analogous to the primary and secondary amines discussed above with the exception that hydrogen atoms in the H—N< or —NH₂ groups are replaced by hydrocarbyl groups. These tertiary amines can be monoamines or polyamines. The monoamines are represented by the formula

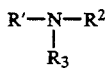

wherein R', R² and R³ are the same or different hydrocarbyl groups. Preferably, R', R² and R³ are independently hydrocarbyl groups of from 1 to about 20 carbon atoms. The tertiary amines can be symmetrical amines, dimethylalkyl amines or those derived from the reaction of a primary amine or a secondary amine with ethylene oxide. The tertiary amines can be aliphatic, cycloaliphatic, aromatic or heterocyclic, including aliphatic-substituted aromatic, aliphatic-substituted cycloaliphatic, aliphatic-substituted heterocyclic, cycloaliphatic-substituted aliphatic, cycloaliphatic substituted aromatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted cycloaliphatic and heterocyclic-substituted aromatic amines. These tertiary amines may be saturated or unsaturated. If unsaturated, the amine is preferably free from acetylenic unsaturation (i.e., —C≡C—). The tertiary amines may also contain non-hydrocarbon substituents or groups as long as these groups do not significantly interfere with the reaction of the amines with component (A) and/or (B) of this invention. Such non-hydrocarbon substituents or groups include lower alkoxy, lower alkyl, mercapto, nitro, and interrupting groups such as —O— and —S— (e.g., as in such groups as —CH₂CH₂—X— CH₂CH₂— where X is —O— or —S—). Examples of such tertiary amines include trimethyl amine, triethyl amine, tripropyl amine, tributyl amine, monomethyldiethyl amine, monoethyldimethyl amine, dimethylpropyl amine, dimethylbutyl amine, dimethylpentyl amine, dimethylhexyl amine, dimethylheptyl amine, dimethyloctyl amine, dimethylnonyl amine, dimethyldecyl amine, dimethyldicodanyl amine, dimethylphenyl amine, N,N-dioctyl-1-octanamine, N,N-didodecyl-1-dodecanamine tricoco amine, trihydrogenated-tallow amine, N-methyldihydrogenated tallow amine, N,N-dimethyl-1-dodecanamine, N,N-dimethyl-1-tetradecanamine, N,N-dimethyl-1-hexadecanamine, N,N-dimethyl-1-octadecanamine, N,N-dimethylcocoamine, N,N-dimethylsoyaamine, N,N-dimethyl hydrogenated tallow amine, etc.

In a particularly advantageous embodiment the amines are hydroxyamines. These hydroxyamines can be primary, secondary, or tertiary amines. Typically, the hydroxyamines are primary, secondary or tertiary alkanol amines or mixtures thereof. Such amines can be represented, respectfully, by the formulae:

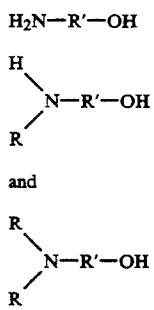

wherein each R is independently a hydrocarbyl group of 1 to about 8 carbon atoms or hydroxyl-substituted hydrocarbyl group of 2 to about 8 carbon atoms and R' is a divalent hydrocarbyl group of about 2 to about 18 carbon atoms. The group —R'—OH in such formulae represents the hydroxyl-substituted hydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group. Where two R groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each R is a lower alkyl group of up to 7 carbon atoms.

The hydroxyamines can also be an ether N-(hydroxy-substituted hydrocarbyl)amine. These are hydroxyl-substituted poly(hydrocarbyloxy) analogs of the above-described hydroxyamines (these analogs also include hydroxyl-substituted oxyalkylene analogs). Such N-(hydroxyl-substituted hydrocarbyl) amines can be conveniently prepared by reaction of epoxides with afore-described amines and can be represented by the formulae:

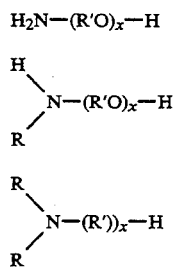

wherein x is a number from about 2 to about 15 and R and R' are as described above.

Polyamine analogs of these hydroxy amines, particularly alkoxylated alkylene polyamines (e.g., N,N-(diethanol)-ethylene diamine) can also be used. Such polyamines can be made by reacting alkylene amines (e.g., ethylenediamine) with one or more alkylene oxides (e.g., ethylene oxide, octadecene oxide) of 2 to about 20 carbons. Similar alkylene oxide-alkanol amine reaction products can also be used such as the products made by reacting the afore-described primary, secondary or tertiary alkanol amines with ethylene, propylene or higher epoxides in a 1:1 or 1:2 molar ratio. Reactant ratios and temperatures for carrying out such reactions are known to those skilled in the art.

Specific examples of alkoxylated alkylene polyamines include N-(2-hydroxyethyl) ethylene diamine, N,N-bis(2-hydroxyethyl)-ethylene-diamine, 1-(2-hydroxyethyl) piperazine, mono(hydroxypropyl)-substituted diethylene triamine, di(hydroxypropyl)-substituted tetraethylene pentamine, N-(3-hydroxybutyl)-tetramethylene diamine, etc. Higher homologs obtained by condensation of the above-illustrated hydroxy alkylene polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid mono- or polyamines are also useful.

Examples of the N-(hydroxyl-substituted hydrocarbyl) amines include mono-, di-, and triethanol amine, diethylethanol amine, di-(3-hydroxyl propyl) amine, N-(3-hydroxyl butyl) amine, N-(4-hydroxyl butyl) amine, N,N-di-(2-hydroxyl propyl) amine, N-(2-hydroxyl ethyl) morpholine and its thio analog, N-(2-hydroxyl ethyl) cyclohexyl amine, N-3-hydroxyl cyclopentyl amine, o-, m- and p-aminophenol, N-(hydroxyl ethyl) piperazine, N,N', di(hydroxyl ethyl) piperazine, and the like.

Further amino alcohols are the hydroxy-substituted primary amines described in U.S. Pat. No. 3,576,743 by the general formula $$R_a-NH_2$$

wherein $R_a$ is a monovalent organic group containing at least one alcoholic hydroxy group. The total number of carbon atoms in $R_a$ preferably does not exceed about 20. Hydroxy-substituted aliphatic primary amines containing a total of up to about 10 carbon atoms are useful. The polyhydroxy-substituted alkanol primary amines wherein there is only one amino group present (i.e., a primary amino group) having one alkyl substituent containing up to about 10 carbon atoms and up to about 6 hydroxyl groups are useful. These alkanol primary amines correspond to $R_a-NH_2$ wherein $R_a$ is a mono-O or polyhydroxy-substituted alkyl group. It is desirable that at least one of the hydroxyl groups be a primary alcoholic hydroxyl group. Specific examples of the hydroxy-substituted primary amines include 2-amino-1-butanol, 2-amino-2-methyl-1-propanol, p-(beta-hydroxyethyl)-aniline, 2-amino-1-propanol, 3-amino-1-propanol, 2-amino-2-methyl-1,3-propanediol,2-amino-2-ethyl-1,3-propanediol,N-(beta-hydroxypropyl)-N'-N'-(beta-aminoethyl)-piperazine, tris-(hydroxymethyl) amino methane (also known as trismethylolamino methane), 2-amino-1-butanol, ethanolamine, beta-(beta-hydroxy ethoxy)-ethyl amine, glucamine, glusoamine, 4-amino-3-hydroxy-3-methyl-1- buten (which can be prepared according to procedures known in the art by reacting isopreneoxide with ammonia), N-3--(aminopropyl)-4-(2-hydroxyethyl)-piperadine, 2-amino-6-methyl-6-heptanol, 5-amine-1-pentanol,N-(beta-hydroxyethyl)-1,3-diamino propane, 1,3-diamino-2-hydroxypropane, N-(beta-hydroxyethoxy-ethyl)-ethylenediamine, trismethylolaminomethane and the like. U.S. Pat. No. 3,576,743 is incorporated herein by reference of the foregoing amines.

Reaction Between Components (A), (B) and (C)

The acids (A) and (B) and the amines (C) are preferably reacted together under salt-forming conditions. The ratio of reactants utilized in the preparation of these inventive emulsifiers may be varied over a wide range. The weight ratio of component (A) to component (B) preferably ranges from about 15:85 to about 85:15, more preferably about 30:70 to about 70:30, more preferably about 35:65 to about 65:35. Generally, from about 0.5 to about 2 equivalents or more, preferably about 0.5 to about 1.5 equivalents, more preferably about 1 equivalent of component (C) are used per mole of the sum of moles for components (A) and (B). That is, the number of equivalents of (C) per number of moles in the combination of (A) and (B) is tn the range of about 0.5:1 to about 2:1, preferably about 0.5:1 to about 1.5:1, more preferably about 1:1.

For purposes of this reaction, an equivalent of component (C) is its molecular weight divided by the total number of nitrogens present in the molecule that are sufficiently basic to form a salt with components (A) and/or (B). These include, for example, the nitrogen atoms of primary aliphatic amines, secondary aliphatic amines and tertiary aliphatic amines as well as amines bearing one aryl group on the nitrogen atom (e.g., aniline). On the other hand, these do not include, for example, amides, (i.e.,

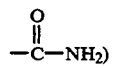

or imides (i.e.,

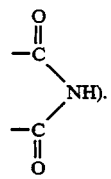

Thus, octylamine has an equivalent weight equal to its molecular weight; ethylene diamine has an equivalent weight equal to one-half of its molecular weight; both ethanolamine and diethylethanolamine have equivalent weights equal to their molecular weights. The equivalent weight of a commercially available mixture of polyalkylene polyamines can be determined by dividing the atomic weight of nitrogen (14) by the % N contained in the polyamine; thus, a polyalkylene polyamine mixture having a % N of 34 would have an equivalent weight of 41.2.

The product of the reaction between components (A), (B) and (C) preferably contains at least some carboxylic salt. Thus, this product is typically constituted of compositions containing at least one compound having at least one carboxylic salt linkage (i.e.,

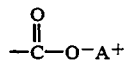

wherein $A^+$ is an amine cation) within its molecular structure. This product can also include other compounds such as amides, esters, and the like. Preferably, these products contain compounds containing such salt linkage at levels of at least about 10% by weight of the product, more preferably at least about 20% by weight, more preferably at least about 35% by weight, more preferably at least about 50% by weight, and still more preferably at least about 75% by weight.

The reactions between components (A, (B) and (C) is preferably carried out under salt-forming conditions using conventional techniques. Typically, components (A), (B) and (C) are mixed together and heated to a temperature in the range of about 20° C. to about 130° C., more preferably about 20° C. to about 50° C.; optionally, in the presence of a normally liquid, substantially inert organic liquid solvent/diluent, until the desired product is formed. In one embodiment, components (A), (B) and (C) are mixed together at room temperature, the mixture exotherms to increase the temperature by about 5° C. to about 20° C., the resulting product forms and is cooled to room temperature.

Optional Additives

In addition to the foregoing emulsifiers, the inventive oil-water emulsions can optionally include one or more dispersants, surfactants and/or alcohols. These additives along with the foregoing emulsifiers and optionally water can be provided in the form of a concentrate that can be added to the oil-water mixture to form the desired emulsion. These concentrates typically comprise from about 10% to about 100% by weight, more preferably from about 10% to about 80% by weight, more preferably about 20% to about 60% by weight of the foregoing emulsifiers. These concentrates can include up to about 10% by weight, preferably up to about 5% by weight, more preferably from about 2% to about 5% by weight of at least one dispersant. These concentrates can include up to about 50% by weight, more preferably from about 20% to about 40% by weight of at least one surfactant. These concentrates can include up to about 50% by weight, more preferably up to about 25% by weight, more preferably from about 5% to about 15% by weight of at least one alcohol. These concentrates can include up to about 50% by weight water, preferably up to about 20% by weight, more preferably from about 5% to about 10% by weight water. These concentrates can be added to the oil-water mixtures at concentration levels in the range of about 0.1% to about 2% by weight, preferably about 0.1% to about 1% by weight, more preferably about 0.2% to about 0.5% by weight of concentrate based on the combined weight of oil and water in the desired oil-water emulsion. Alternatively, the foregoing emulsifiers as well as the optional dispersants, surfactants and alcohols can be added separately to the oil-water mixture during preparation of the desired emulsion.

The foregoing emulsifiers can be prepared by reacting components (A), (B) and (C) with each other, as discussed above, in the presence of any or all of one or more of these dispersants, surfactants and/or alcohols as well as water. The dispersants, surfactants and alcohols that can be used are discussed below.

Dispersants

The dispersants that are useful in the inventive emulsions include the nitrogen-containing dispersants made by the reaction of at least one carboxylic acid acylating agent having at least one hydrocarbyl substituent of about 12 to about 500 carbon atoms with (a) at least one N-(hydroxyl-substituted hydrocarbyl) amine, (b) at least one hydroxyl-substituted poly(hydrocarbyloxy) analog of (a), or (c) mixtures of (a) and (b). The hydrocarbyl substituents preferably contain from about 30 to about 500 carbon atoms, more preferably from about 50 to about 500 carbon atoms. A preferred hydrocarbyl substituent is polyisobutenyl. The carboxylic acid acylating agent can be a monocarboxylic or polycarboxylic acid or acid derivative (e.g., anhydride, halide). The hydrocarbyl-substituted succinic acids and anhydrides are preferred acylating agents. The amines are preferably alkanol tertiary monoamines of up to about 40 carbon atoms with N,N-diethylethanolamine being particularly preferred. The acylating agent and amine are preferably reacted with each other under ester- and/or salt-forming conditions. A preferred dispersant is the reaction product of polyisobutenyl succinic anhydride and N,N-diethylethanolamine. In one embodiment, this preferred dispersant comprises an ester/salt (that is, a half-ester and half-salt product) made by reacting polyisobutenyl (number average molecular weight of about 950) succinic anhydride with N,N-diethylethanolamine at a molar ratio of 1:2. The composition and preparation of these dispersants are described in U.S. Pat. No. 4,368,133 at Col. 2, lines 22–31; Col. 2, line 66 to Col. 9, line 44; and Col. 13, lines 11–18 and 33–39; these passages from this patent being incorporated herein by reference.

As indicated above, these dispersants can be added to oil-water mixtures to form the desired emulsions as part of a concentrate comprising the foregoing emulsifiers as well as one or more optional surfactants and/or alcohols. These dispersants can also be added directly to the oil-water mixture. When added directly, said dispersants are preferably added at concentrations of up to 0.2% by weight, preferably up to about 0.1% by weight, based on the combined weight of the oil and water in the desired emulsion.

Surfactants

The surfactants that are useful in the emulsions of the invention can be of the anionic or nonionic type. Many such surfactants of each type are known to the art. See, for example, McCutcheon's "Emulsifiers & Detergents", 1983, North American Edition, pp. 61–299, and International Edition, pp. 1–225, published by McCutcheon Division, MC Publishing Co., Glen Rock, N.J., U.S.A.; these pages being incorporated herein by reference.

Among the nonionic surfactant types are the alkylene oxide-treated products, such as ethylene oxide- treated phenols, alcohols, esters, amines and amides. Ethylene oxide/propylene oxide block copolymers are also useful nonionic surfactants. Glycerol esters and sugar esters are also known to be nonionic surfactants. A typical nonionic surfactant class useful with the present invention are the alkylene oxide-treated alkyl phenols such as the ethylene oxide alkyl phenol condensates sold by the Rohm & Haas Company. A specific example of these is Triton X-100 which contains an average of 9–10 ethylene oxide units per molecule, has an HLB value of about 13.5 and a molecular weight of about 628. Many other suitable nonionic surfactants are known; see, for example, the aforementioned McCutcheon's as well as the treatise "Non-Ionic Surfactants" edited by Martin J. Schick, M. Dekker Co., New York, 1967, which is herein incorporated by reference for its disclosures in this regard.

As noted above, anionic surfactants can also be used. Generally, these are all hydrophilic surfactants. Anionic surfactants contain negatively charged polar groups. A general survey of useful surfactants is found in the Encyclopedia of Chemical Technology under the heading "Surfactants and Detersive Systems", Third Edition, Kirk-Othmer, Volume 22, pp. 332–432 (1983, John Wiley and Son, New York), these pages being :incorporated herein by reference, and the aforementioned compilation published under the name of McCutcheon's.

Among the useful anionic surfactant types are the widely known carboxylate soaps, organo sulfates, sulfonates, sulfocarboxylic acids and their salts, and phosphates. The alkali metal organo sulfonates (e.g., alkali metal petroleum sulfonates, especially sodium petroleum sulfonates) are particularly useful. Various anionic surfactants are available from the industry, particularly from such companies as Rohm & Haas and Union Carbide Corporation, both of America. Further information about anionic surfactants also can be found in the texts "Anionic Surfactants", Parts II and III, edited by W. M. Linfield, published by Marcel Dekker, Inc., New York, 1976, these sections of this reference being incorporated herein by reference.

As indicated above, these surfactants can be added to oil-water mixtures to form the desired emulsions as part of a concentrate comprising the foregoing emulsifiers as well as one or more optional dispersants and/or alcohols. These surfactants can also be added directly to the oil-water mixture. When added directly, said surfactants are preferably added at concentrations of up to 1% by weight, preferably from about 0.01% to about 1% by weight, more preferably from about 0.02% to about 0.8% by weight, based on the combined weight of oil and water in the desired emulsion.

Alcohols

The alcohols that are useful in the inventive emulsion can be represented by the formula ROH wherein R is a hydrocarbyl group of from 1 to about 18 carbon atoms, preferably from about 6 to about 16 carbon atoms, more preferably from about 8 to about 14 carbon atoms. These alcohols can be aliphatic, cycloaliphatic, aromatic, and heterocyclic, including aliphatic-substituted cycloaliphatic alcohols, aliphatic-substituted aromatic alcohols, aliphatic-substituted heterocyclic alcohols, cycloaliphatic-substituted aliphatic alcohols, cycloaliphatic-substituted aromatic alcohols, cycloaliphatic-substituted heterocyclic alcohols, heterocyclic-substituted aliphatic alcohols, heterocyclic-substituted cycloaliphatic alcohols, and heterocyclic-substituted aromatic alcohols.

Examples include methyl alcohol, ethyl alcohol, n-propyl alcohol, n-butyl alcohol, n-pentyl alcohol, n-hexylalcohol, ethylhexyl alcohol, n-heptylalcohol, n-octyl alcohol, n-decyl alcohol, n-dodecyl alcohol, n-tetradecyl alcohol, n-hexadecyl alcohol, n-octadecyl alcohol, isopropyl alcohol, isobutyl alcohol, sec-butyl alcohol, tert-butyl alcohol, isopentyl alcohol, tert-pentylalcohol, cyclopentanol, cyclohexanol, allyl alcohol, crotyl alcohol, methylvinyl carbinol, benzyl alcohol, alpha-phenylethyl alcohol, beta-phenylethyl alcohol, diphenylcarbinol, cinnamyl alcohol. Commercial mixtures of alcohols such as $C_{12-14}$ alcohol mixtures are useful.

As indicated above, these alcohols can be added to oil-water mixtures to form the desired emulsions as part of a concentrate comprising the foregoing emulsifiers as well as one or more optional surfactants and/or dispersants. These alcohols can also be added directly to the oil-water mixture. When added directly, said alcohols are preferably added at concentrations of up to 1% by weight, preferably up to about 0.5% by weight, more preferably in the range of about 0.05% to about 0.3% by weight, based on the combined weight of the oil and water in the desired emulsion.

The inventive oil-water emulsions are stable and have reduced viscosities when compared with the oils from which such emulsions are derived. These properties make these emulsions suitable for transport through a conduit or pipeline, even when the oil is a viscous crude oil. Thus, the invention provides for a method of transporting oil comprising the steps of forming the inventive oil-water emulsion, and pumping said emulsion through a conduit or pipeline using conventional pumping techniques.

The inventive oil-water emulsions are combustible when the water content of said emulsion is up to about 40% by weight, preferably in the range of about 10% to about 40% by weight, more preferably about 20% to about 40% by weight, more preferably about 25% to about 35% by weight, these emulsions can be burned using conventional techniques in the same manner as fuel oil to generate heat, for example, in the generation of heat for electric power plants. Thus the invention provides for a combustible fuel, the fuel comprising the inventive oil-water emulsions wherein the water content is up to about 40% by weight, preferably in the range of about 10% to about 40% by weight, more preferably about 20% to about 40% by weight, more preferably about 25% to about 35% by weight. The invention also provides for a method for generating heat, the method comprising burning or combusting the inventive oil-water emulsions using conventional techniques wherein the water content of said emulsions is up to about 40% by weight, preferably in the range of about 10% to about 40% by weight, more preferably about 20% to about 40% by weight, more preferably about 25% to about 35% by weight.

EXAMPLES

The following Examples 1-6 disclose exemplary preparations of emulsifiers that are useful in formulating the inventive oil-water emulsions. Unless otherwise indicated, in the following examples as well as throughout the entire specification and in the appended claims, all parts and percentages are by weight, all temperatures are in degrees centigrade, and all pressures are atmospheric. In one or more of Examples 1-6 the following commercially available materials are used:

(1) Unitol DT-40, a product of Union Camp identified as a distilled tall oil and having a monomeric fatty acid content of 40% by weight, a dimerized fatty acid content of 11% by weight, an esterified fatty acid content of 7% by weight, a rosin acid content of about 40% by weight, and 2% by weight unsaponifiables;

(2) Sodium petroleum sulfonate, commercially available material that is 62% by weight sodium petroleum sulfonate, 33% by weight diluent, the molecular weight of $RSO_3$—being about 430, the sulfur content being about 4.5% by weight and the sodium content being about 3.4% by weight; and (3) Polyisobutenyl succinic anhydride/N,N-diethyl ethanolamine reaction product, commercially available material made by reacting one mole of polyisobutenyl (number average molecular weight of about 950) succinic anhydride with two moles of N,N-diethylethanolamine under ester/salt-forming conditions.

EXAMPLE 1

20.9 parts by weight of Unitol DT-40 and 4.1 parts by weight of monoethanolamine are blended together at room temperature for 30 minutes. The mixture exotherms to 25°-35° C. The mixture is cooled to room temperature to provide the desired product.

EXAMPLE 2

41.75 parts of Unitol DT-40, 8.25 parts of monoethanolamine, 25.9 parts of ethylhexyl alcohol and 24.1 parts of water are blended together at room temperature for 30 minutes. The mixture exotherms to 25°-35° C. The mixture is cooled to room temperature to provide the desired product.

EXAMPLE 3

34.75 parts of Unitol DT-40, 6.85 parts of monoethanolamine, 8.06 parts of ethylhexyl alcohol, 39.03 parts of sodium petroleum sulfonate, 3.8 parts polyisobutenyl succinic anhydride/N,N-diethylethanolamine reaction product, and 7.51 parts of water are blended together at room temperature for 30 minutes. The mixture exotherms to 25°-35° C. The mixture is cooled to room temperature to provide the desired product.

EXAMPLE 4

60.80 parts of Unitol DT-40, 12.00 parts of monoethanolamine, 14.10 parts of ethylhexyl alcohol and 13.10 parts of water are blended together at room temperature for 30 minutes. The mixture exotherms to 25°-35° C. The mixture is cooled to room temperature to provide the desired product.

EXAMPLE 5

41.75 parts of Unitol DT-40, 8.25 parts of monoethanolamine, 25.9 parts of a commercial $C_{12-14}$ alcohol mixture, and 24.1 parts of water are blended together at room temperature for 30 minutes. The mixture exotherms to 25°-35° C. The mixture is cooled to room temperature to provide the desired product.

EXAMPLE 6

41.75 parts of Unitol DT-40, 8.25 parts of monoethanolamine, and 25.9 parts of a commercial $C_{12-14}$ alcohol mixture are blended together at room temperature for 30 minutes. The mixture exotherms to 25°-35° C. The mixture is cooled to room temperature to provide the desired product.

In order to further illustrate the invention, oil-water emulsions employing emulsifiers prepared in accordance with Examples 1–6 are disclosed below. With each of the emulsions disclosed below, the oil is Cerro Negro crude oil from the Orinoco Oil Belt. Two samples of this crude oil had the following analyses:

|  | Sample No. 1 | Sample No. 2 |
|---|---|---|
| Sulfur, % wt. | 3.38 | 3.58 |
| Nitrogen, % wt. | 0.64 | 0.62 |
| Cl, ppm | 248 | 388 |
| Na, ppm | 144 | 51 |
| Ca, ppm | 39 | 12 |
| Mg, ppm | 14 | 2 |
| Zn, ppm | 23 | Nil |
| Fe, ppm | 89 | 14 |
| Ash, % wt. | 0.096 | 0.008 |
| Brookfield Viscosity @ 40° C., cPs | 48,500 | 43,000 |
| API Gravity | 8° | 8° |

Each of the emulsions have an oil:water weight ratio of 70:30. Each emulsion is treated with an emulsifier prepared in accordance with the foregoing Examples 1–6 at a concentration in the range of 0.2%–0.4% by weight, the particular emulsifier and the concentration level being indicated in Table I below. The emulsions are made using the following procedure:

(1) a Waring blender is charged with 60 grams of tap water, then 140 grams of crude oil;

(2) the crude oil/water mixture is placed in an 85° C. oven and brought up to approximately that temperature;

(3) the crude oil/water mixture is blended at a stirring rate of 8,000–10,000 rpm while adding the emulsifier;

(4) upon completion of the addition of the emulsifier the stirring rate is increased to 15,000 rpm and maintained at that rate for two minutes, the initial and final temperature of the emulsion before and after blending being indicated in Table I;

(5) the emulsion is poured into a pint jar and sealed;

(6) the emulsion is cooled to room temperature and then analyzed.

TABLE I

| Example | A | B | C | D | E | F | G | H |
|---|---|---|---|---|---|---|---|---|
| Emulsifier |  |  |  |  |  |  |  |  |
| (1) Product of Example No. | 1 | 1 | 1 | 2 | 3 | 4 | 5 | 6 |
| (2) Concentration, wt % | 0.4 | 0.3 | 0.2 | 0.4 | 0.4 | 0.4 | 0.4 | 0.4 |
| Blend temperature, °C. (Initial/Final) | 82/84 | 81/83 | 81/83 | 82/84 | 86/84 | 82/83 | 82/83 | 82/85 |
| Brookfield Viscosity, 40° C., No. 3 Spindle at 10 rpm, cPs | 7300 | 3000 | 300 | 3600 | 6100 | 5250 | 2400 | 5200 |
| Storage Stability |  |  |  |  |  |  |  |  |
| (1) Time (hours) | 528 | 120 | 168 | 528 | 880 | 528 | 336 | 264 |
| (2) Separation | slight | none | none | slight | slight | slight | none | none |

The data in Table I indicates that the viscosity of a heavy viscous crude oil can be significantly reduced by the formation of oil-water emulsions within the scope of the present invention. These oil-water emulsions can be facilitatingly pumped through a conduit or pipeline for further processing whereas the crude per se, because of its high viscosity, is difficult, if not impossible, to transport through a pipeline. These emulsions are sufficiently stable for transport through a pipeline. These emulsions can also be burned as a fuel in the same manner as fuel oil.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. An oil-in-water emulsion comprising 30% or less water, a minor emulsifying amount of at least one emulsifier, and a crude oil having a Brookfield Viscosity in the range of about 20,000 to about 250,000 Centipoise at 40° C., said emulsifier comprising the reaction product of:

(A) at least one saturated or unsaturated aliphatic monocarboxylic acid of about 12 to about 24 carbon atoms;

(B) at least one acid of the general formula $C_{19}H_nCOOH$, wherein n is a number in the range of about 27 to about 31, and having a phenanthrene nucleus; and (C) at least one hydroxyamine.

2. The emulsion of claim 1 wherein (A) has from about 12 to about 22 carbon atoms.

3. The emulsion of claim 1 wherein (A) has from about 16 to about 18 carbon atoms.

4. The emulsion of claim 1 wherein (A) comprises at least one fatty acid.

5. The emulsion of claim 1 wherein (A) comprises at least one saturated acid.

6. The emulsion of claim 1 wherein (A) comprises at least one acid selected from the group of acids consisting of:
lauric acid,
myristic acid,
palmitic acid,
stearic acid,
arachidic acid,
behenic acid, and
lignoceric acid.

7. The emulsion of claim 1 wherein (A) comprises at least one unsaturated acid.

8. The emulsion of claim 1 wherein (A) comprises at least one acid selected from the group of acids consisting of:
myristoleic acid,
palmitoleic acid,
oleic acid,
elaidic acid,
erucic acid,
ricinoleic acid,
linoleic acid,
linolenic acid,
licanic acid, and
eleostearic acid.

9. The emulsion of claim 1 wherein (A) comprises at least one tall oil acid.

10. The emulsion of claim 1 wherein (B) comprises at least one acid selected from the group consisting of abietic acid, dihydroabietic acid, dehydroabietic acid, neoabietic acid, palustric acid, pimaric acid, isopimaric acid, levopimaric acid, and mixtures of two or more thereof.

11. The emulsion of claim 1 wherein (B) comprises at least one rosin acid.

12. The emulsion of claim 1 wherein (A) and (B) are derived from tall oil.

13. The emulsion of claim 1 wherein (C) comprises at least one primary amine.

14. The emulsion of claim 1 wherein (C) comprises at least one secondary amine.

15. The emulsion of claim 1 wherein (C) comprises at least one tertiary amine.

16. The emulsion of claim 1 wherein (C) comprises at least one polyamine.

17. The emulsion of claim 1 wherein (C) comprises (a) at least one N-(hydroxyl-substituted hydrocarbyl)amine, (b) at lest one hydroxyl-substituted poly(hydrocarbyloxy) analog of (a), or (c) a mixture of (a) and (b).

18. The emulsion of claim 1 wherein (C) comprises at least one alkanol amine containing up to about 40 carbon atoms.

19. The emulsion of claim 1 wherein (C) is selected from the group consisting of (a) primary, secondary and tertiary alkanol amines which can be represented correspondingly by the formulae

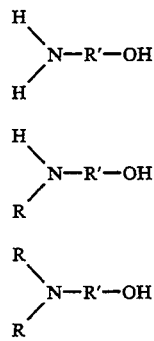

(b) hydroxyl-substituted oxyalkylene analogs of said alkanol amines represented by the formulae

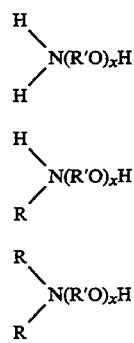

wherein each R is independently a hydrocarbyl group of one to about 8 carbon atoms or a hydroxyl-substituted hydrocarbyl group of 2 to about 8 carbon atoms, R' is a divalent hydrocarbyl group of 2 to about 18 carbon atoms, x is a number in the range of 2 to about 15, and (c) mixtures of two of more thereof.

20. The emulsion of claim 1 wherein (C) comprises monoethanolamine.

21. The emulsion of claim 1 wherein the weight ratio of (A) to (B) is in the range of about 15:85 to about 85:15.

22. The emulsion of claim 1 wherein the molar ratio of the combination of (A) and (B) to (C) is in the range of about 0.5:1 to about 2:1.

23. The emulsion of claim 1 further comprising at least one alcohol of from 1 to about 18 carbon atoms.

24. The emulsion of claim 1 further comprising at least one anionic surfactant.

25. The emulsion of claim 1 further comprising at least one nonionic surfactant.

26. The emulsion of claim 1 further comprising the reaction product of at least one carboxylic acid acylating agent having at least one hydrocarbyl-based substituent of about 12 to about 500 carbon atoms with (a) at least one N-(hydroxyl-substituted hydrocarbyl)amine, (b) at least one hydroxyl-substituted poly(hydrocarbyloxy) analog of (a), or (c) mixtures of (a) and (b).

27. An oil-in-water emulsion comprising 30% or less, a minor emulsifying amount of at least one emulsifier, said emulsion containing less than about 30% by weight water, said oil being a crude oil having a Brookfield viscosity in the range of about 20,000 to about 250,000 Centipoise at 40° C., said emulsifier comprising the reaction product of:
(A) at least one saturated or unsaturated aliphatic monocarboxylic acid of about 12 to about 24 carbon atoms;
(B) at least one acid of the general formula $C_{19}H_nCOOH$, wherein n is a number in the range of about 27 to about 31, and having a phenanthrene nucleus; and
(C) at least one hydroxyamine;
said emulsion optionally including one or more of:
(i) at least one alcohol of from 1 to about 18 carbon atoms;
(ii) at least one anionic or nonionic surfactant; and/or
(iii) at least one reaction product of at least one carboxylic acid acylating agent having at least one hydrocarbyl-based substituent of about 12 to about 500 carbon atoms with (a) at least one N-(hydroxyl-substituted hydrocarbyl) amine, (b) at least one hydroxyl-substituted poly(hydrocarbyloxy) analog of (a), or (c) mixtures of (a) and (b).

28. An oil-in-water emulsion comprising from about 70% to about 90% by weight oil, said oil being a crude oil having a Brookfield viscosity in the range of about 20,000 to about 250,000 centipoise at 40' C., from about 10% to about 30% by weight water, and from about 0.1% to about 2% by weight of a composition comprising:
(i) from about 10% to about 100% by weight of the reaction product of: (A) at least one saturated or unsaturated aliphatic monocarboxylic acid of about 12 to about 24 carbon atoms; (B) at least one acid of the general formula $C_{19}H_nCOOH$, wherein n is a number in the range of about 27 to about 31, and having a phenanthrene nucleus; and (C) at least one hydroxyamine;
(ii) up to about 50% by weight of at least one alcohol of from 1 to about 18 carbon atoms;
(iii) up to about 50% by weight of at least one anionic or nonionic surfactant;
(iv) up to about 10% by weight of at least one reaction product of at least one carboxylic acid acylating agent having at least one hydrocarbyl-based substituent of about 12 to about 500 carbon atoms with (a) at least one N-(hydroxyl-substituted hydrocarbyl) amine, (b) at least one hydroxyl-substituted poly(hydrocarbyloxy) analog of (a), or (c) mixtures of (a) and (b); and/or
(v) up to about 50% by weight water.

29. An oil-in-water emulsion comprising from about 70% to about 90% by weight oil, said oil being a crude oil having a Brookfield viscosity in the range of about 20,000 to about 250,000 centipoise at 40° C., from about 10% to about 30% by weight water, and from about 0.0005% to about 2% by weight of the reaction product of:
(A) at least one saturated or unsaturated aliphatic monocarboxylic acid of about 12 to about 24 carbon atoms;
(B) at least one acid of the general formula $C_{19}H_nCOOH$, wherein n is a number in the range of about 27 to about 31, and having a phenanthrene nucleus; and
(C) at least one hydroxyamine.

30. An oil-in-water emulsion comprising from about 70% to about 90% by weight oil, said oil being a crude oil having a Brookfield viscosity in the range of about 20,000 to about 250,000 centipoise at 40° C., from about 10% to about 30% by weight water, and from about 0.01% to about 1% by weight of the reaction product of:
(A) at least one saturated or unsaturated aliphatic monocarboxylic acid of about 12 to about 24 carbon atoms;
(B) at least one acid of the general formula $C_{19}H_nCOOH$, wherein n is a number in the range of about 27 to about 31, and having a phenanthrene nucleus; and
(C) at least one hydroxyamine.

31. An oil-in-water emulsion comprising from about 60% to about 90% by weight oil, said oil being a crude oil having a Brookfield viscosity in the range of about 20,000 to about 250,000 centipoise at 40° C., from about 10% to about 40% by weight water, and from about 0.05% to about 0.5% by weight of the reaction product of:
(A) at least one saturated or unsaturated aliphatic monocarboxylic acid of about 12 to about 24 carbon atoms;
(B) at least one acid of the general formula $C_{19}H_nCOOH$, wherein n is a number in the range of about 27 to about 31, and having a phenanthrene nucleus; and
(C) at least one hydroxyamine.

32. An oil-in-water emulsion comprising a continuous water phase, a discontinuous oil phase, and a minor emulsifying amount of at least one emulsifier, said emulsion containing less than about 80% by weight water, said oil being crude oil having a Brookfield viscosity in the range of about 20,000 to about 250,000 centipoise at 40° C., said emulsifier comprising the reaction product of (A) at least one fatty acid, (B) at least one rosin acid, and (C) monoethanolamine.

33. The composition of claim 32 further comprising at least one alcohol of from 1 to about 18 carbon atoms.

34. The composition of claim 32 further comprising at least one alkali metal petroleum sulfonate.

35. The emulsion of claim 32 further comprising the reaction product of polyisobutenyl succinic anhydride and N,N-diethylethanolamine.

36. An oil-in-water emulsion comprising a minor emulsifying amount of at least one emulsifier, said emulsion containing less than about 30% by weight water, and a crude oil having a Brookfield viscosity in the range of about 20,000 to about 250,000 centipoise at 40° C., said emulsifier comprising the reaction product of tall oil and monoethanolamine.

37. An oil-in-water emulsion comprising 30% or less water a crude oil, said oil having a Brookfield viscosity in the range of about 20,000 to about 250,000 centipoise at 40° C.; and a minor emulsifying amount of a composition comprising the reaction product of at least one fatty acid, at least one rosin acid and monoethanolamine; and optionally one or more of
(i) at least one alcohol of from 1 to about 18 carbon atoms;
(ii) at least one alkali metal petroleum sulfonate; and/or
(iii) the reaction product of polyisobutenyl succinic anhydride and N,N-diethylethanolamine.

38. An oil-in-water emulsion comprising from about 10% to about 30% by weight water; from about 70% to about 90% by weight oil, said oil being a crude oil having a Brookfield viscosity in the range of about 20,000 to about 250,000 centipoise at 40° C.; and from about 0.1% to about 2% by weight of a composition comprising:
- (i) from about 10% to about 100% by weight of the reaction product of at least one C-12 to C-24 fatty acid, at least one rosin acid and monoethanolamine;
- (ii) up to about 50% by weight of at least one alcohol of from 1 to about 18 carbon atoms;
- (iii) up to about 50% by weight of at least one alkali metal petroleum sulfonate;
- (iv) up to about 10% by weight of the reaction product of polyisobutenyl succinic anhydride and N,N-diethylethanolamine; and
- (v) up to about 50% by weight water.

39. A method of making an oil-in-water emulsion the method comprising blending water, at least one oil and at least one emulsifying agent with each other under oil-in-water emulsion-forming conditions, said emulsion having a continuous water phase and a discontinuous oil phase, a water content of up to about 20% by weight, said oil being a crude oil having a Brookfield viscosity in the range of about 20,000 to about 250,000 centipoise at 40° C., said emulsifying agent comprising the reaction product of:
- (A) at least one saturated or unsaturated aliphatic monocarboxylic acid of about 12 to about 24 carbon atoms;
- (B) at least one acid of the general formula $C_{19}H_nCOOH$, wherein n is a number in the range of about 27 to about 31, and having a phenanthrene nucleus; and
- (C) at least one hydroxyamine.

40. A method for transporting oil, the method comprising forming an oil-in-water emulsion of oil and pumping said emulsion through a conduit, said emulsion comprising 30% or less water, a crude oil having a Brookfield viscosity in the range of about 20,000 to about 250,000 centipoise at 40° C., and a minor emulsifying amount of the reaction product of:
- (A) at least one saturated or unsaturated aliphatic monocarboxylic acid of about 12 to about 24 carbon atoms;
- (B) at least one acid of the general formula $C_{19}H_nCOOH$, wherein n is a number in the range of about 27 to about 31, and having a phenanthrene nucleus; and
- (C) at least one hydroxyamine.

41. A method for generating heat comprising burning an oil-in-water emulsion, said emulsion comprising a continuous water phase, said water being at a concentration of up to about 30% by weight, a discontinuous oil phase, said oil being a crude oil having a Brookfield viscosity in the range of about 20,000 to about 250,000 centipoise at 40° C., and a minor emulsifying amount of the reaction product of:
- (A) at least one saturated or unsaturated aliphatic monocarboxylic acid of about 12 to about 24 carbon atoms;
- (B) at least one acid of the general formula $C_{19}H_nCOOH$, wherein n is a number in the range of about 27 to about 31, and having a phenanthrene nucleus; and
- (C) at least one hydroxyamine amine.

* * * * *